United States Patent
Konrad et al.

(10) Patent No.: US 6,472,091 B1
(45) Date of Patent: Oct. 29, 2002

(54) FUEL CELL SYSTEM AND METHOD FOR SUPPLYING ELECTRIC POWER IN A MOTOR VEHICLE

(75) Inventors: Gerhard Konrad, Ulm; Josef Zieger, Esslingen; Arnold Lamm, Oberelchingen; Wolfgang Von Schwerin, Leutenbach; Karl-Ernst Noreikat, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/576,860

(22) Filed: May 22, 2000

(30) Foreign Application Priority Data

May 22, 1999 (DE) .......................................... 199 23 738

(51) Int. Cl.$^7$ .......................... H01M 8/04; B60L 11/18
(52) U.S. Cl. .......................... 429/13; 429/22; 180/65.3
(58) Field of Search .............................. 429/13, 22, 23; 180/65.3, 68.3

(56) References Cited

U.S. PATENT DOCUMENTS

| | | | |
|---|---|---|---|
| 5,326,229 A | * | 7/1994 | Collins .................. 180/68.3 X |
| 5,523,176 A | | 6/1996 | Fonda-Bonardi ............. 429/74 |
| 5,662,184 A | | 9/1997 | Riemer et al. ............. 180/65.1 |
| 5,780,981 A | * | 7/1998 | Sonntag et al. ........... 429/23 X |
| 6,068,942 A | * | 5/2000 | Strasser et al. ................ 429/13 |
| 6,110,611 A | * | 8/2000 | Stühler et al. ................. 429/13 |
| 6,138,781 A | * | 10/2000 | Hakala .................. 180/65.3 X |

FOREIGN PATENT DOCUMENTS

| | | |
|---|---|---|
| DE | 19523109 A1 | 1/1997 |
| DE | 19703171 A1 | 8/1998 |
| DE | 19822689 | 11/1999 |
| EP | 0897825 | 2/1999 |

* cited by examiner

*Primary Examiner*—Stephen Kalafut
(74) *Attorney, Agent, or Firm*—Crowell & Moring LLP

(57) ABSTRACT

A fuel cell system and method for supplying electrical devices with electric energy in a vehicle wherein, to increase the efficiency of the power generation, the fuel cell system is supplied with atmospheric oxygen from the compressed air system. Additionally, a compressed air reservoir or a compressor for ambient air is provided in order to supply the fuel cell system with atmospheric oxygen.

14 Claims, 1 Drawing Sheet

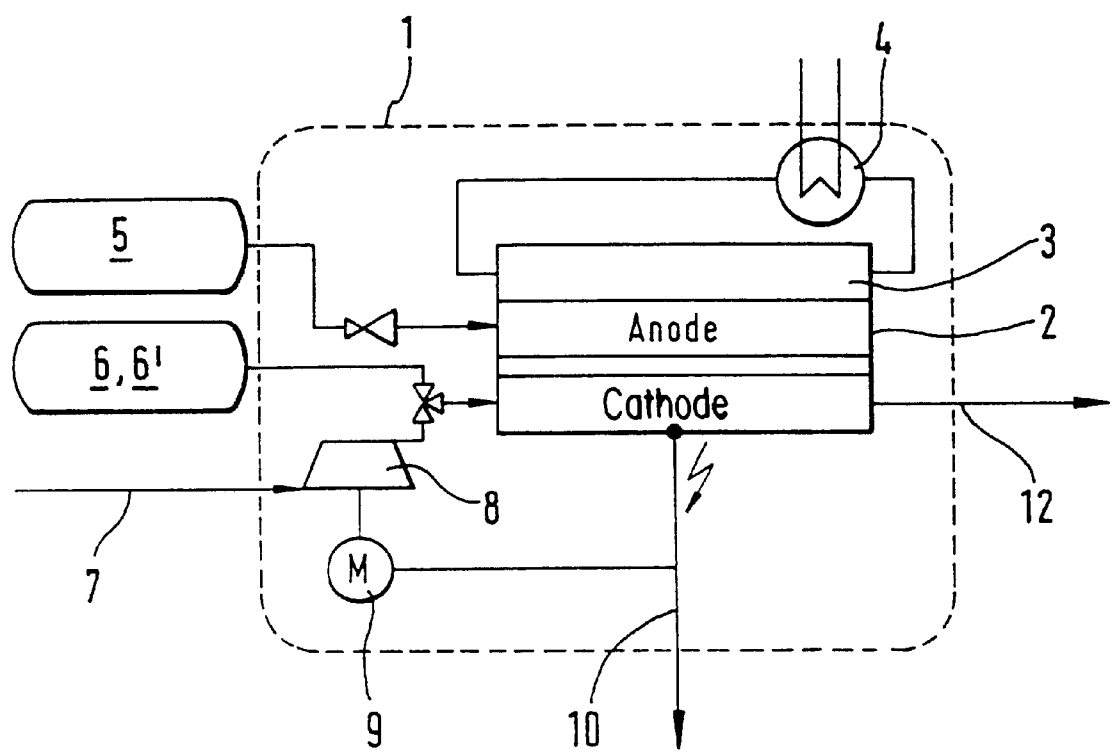

FUEL CELL SYSTEM AND METHOD FOR SUPPLYING ELECTRIC POWER IN A MOTOR VEHICLE

BACKGROUND AND SUMMARY OF THE INVENTION

This application claims the priority of German Application 19923738.7, filed May 22, 1999, the disclosure of which is expressly incorporated by reference herein.

The invention relates to a fuel cell system for supplying electrical apparatus with electrical energy in a vehicle powered by an internal combustion engine or by fuel cells, as well as a method for supplying power by means of such a fuel cell system in a vehicle.

Fuel cell systems for supplying electrical apparatus of a motor vehicle powered by an internal combustion engine are disclosed in German Patents DE 195 23 109 A1 and DE 197 03 171 A1. These patents use a fuel cell system instead of a generator driven by the internal combustion engine. Fuel cells convert the chemical energy released by the oxidation of a fuel to electrical energy, the fuels used being, for example, hydrogen, hydrocarbons or methanol, and the oxidizers being usually air or pure oxygen. In the fuel cell systems of the above patents, the hydrogen is obtained as fuel for the fuel cell system by the separation or reformation of the liquid fuel that is necessary for the operation of the internal combustion engine. The fuel components left over are used to power the internal combustion engine. The hydrogen thus obtained is fed as fuel to the anode side of the fuel cell system. Usually, atmospheric oxygen is used as the oxidizer, and it is aspirated from the ambient air by a compressor and fed to the cathode side of the fuel cell system.

The compressor used for delivering atmospheric oxygen to the fuel cell must in turn be powered electrically or mechanically, so that electrical or mechanical energy is additionally consumed, which lowers the efficiency of the power generation. Furthermore, such a compressor is an additional component liable to trouble.

One object of the present invention is to create a fuel cell system of the kind described above, which achieves a greater power generation efficiency while at the same time using fewer components. It is another object of provide a system which is able to be operated very effectively.

The fuel cell system of the invention is connected by a supply line with the compressed air system of the vehicle, which serves for supplying the compressed air brake system, among other things, in order to deliver the necessary atmospheric oxygen to the fuel cell system. Especially in the case of a vehicle powered by an internal combustion engine, in which the internal combustion engine drives the air compressor of the compressed-air system, the fuel cell system supplying the electric power is connected to the air compressor by a supply line for feeding the necessary atmospheric oxygen.

Usually the compressed air system of the vehicle operates at about 8 to 12 bar. The air compressor serving to supply this compressed air system in vehicles with an internal combustion engine is either driven directly or with a system of belts. The rate of air delivery depends on the speed of the motor. In order to make sufficient air available for the brake system, even at low speeds, the air compressor must be of an appropriate size, and also intermediate tanks must be provided for the compressed air (e.g., when the motor is idle). Comparable conditions prevail in vehicles driven by fuel cells. As a result, at high rpm as well as in long travel distances in which little braking is done, the air compressor compresses and delivers great amounts of air and most of it is unused excess air which is discharged into the exhaust system of the vehicle.

The invention now permits the air compressed and delivered by the compressed air brake system to be used effectively for the generation of power by a fuel cell system, so that the efficiency of the power generation is increased and there is no longer a need for a compressor previously required for ambient air for the fuel cells.

The invention is not limited to a hydrogen fuel cell with a hydrogen tank of its own, but is suitable for any fuel cell systems which are used in motor vehicles to produce electric current, such as those which produce the necessary hydrogen by separating or reforming a hydrocarbon or alcohol, or which have a liquid anode circuit like direct methanol fuel cells (DMFC).

The invention can further be used both in vehicles with an internal combustion engine as well as an electric drive, as long as the vehicle has a compressed air system.

It is advantageous to reserve a portion of the compressed air produced by the compressed air system and to connect the reserve tank to the supply line of the fuel cell system for atmospheric oxygen. In this manner a briefly elevated electric energy demand can be covered to the extent that the amount of fuel needed for the fuel cell system is available. It is practical to use also the tank that is present anyway in the compressed air to be delivered to the fuel cell system.

It can furthermore be advantageous to provide a compressor for ambient air, which can be connected to the supply line carrying atmospheric oxygen, and which is driven by this system. In this way, in the event of a stalled motor or lack of air in the brake system, the air supply to the fuel cells can be sustained independently of the internal combustion engine. The air necessary for starting the fuel cells can in this case be taken from a compressed air storage tank. The compressor of the present invention can be made smaller than the previously needed compressor which was alone responsible for feeding air to the fuel cell system.

The air compressor of the present invention may be electrically powered by the fuel cell system and at the same time feed the necessary atmospheric oxygen to the fuel cell system.

Before compressed air is introduced at the anode end of the fuel cells the pressure must be adapted for example by a pressure reducer. The use of reserve compressed air is possible in the case of low engine speeds, when the motor is off or in case of lack of compressed air in the compressed air system. The additional supplying of air to the fuel cell system by a compressor is especially advantageous in the case of high energy demand, e.g., due to the switching on of an air conditioner. Moreover, in this manner the air requirements of the fuel cells can be provided also when the vehicle is standing with electrical accessories running.

Other objects, advantages and novel features of the present invention will become apparent from the following detailed description of the invention when considered in conjunction with the accompanying drawings.

BRIEF DESCRIPTION OF THE DRAWINGS

The FIGURE shows a fuel cell system according to the invention for supplying electricity in a motor vehicle powered by internal combustion engine or fuel cell power.

DETAILED DESCRIPTION OF THE PREFERRED EMBODIMENT

In the figure, the fuel cell system has an arrangement of fuel cells which consists, in a known manner, of an anode and a cathode which are contained in an electrolyte. The fuel consumed in the fuel cell arrangement is fed to the anode side. The oxygen necessary for the oxidation of the fuel is introduced into the fuel cell system 2 on the cathode side. The fuel arrangement is cooled by means of a cooling system 3, and the removed heat is fed to a heat exchanger 4.

In the present embodiment, hydrogen is used as fuel for the fuel cell system and is taken from a hydrogen tank 5. After suitable reduction of pressure to the working pressure of the fuel cell, the hydrogen is fed in gas form to the anode side of the fuel cell system 2. Instead of the hydrogen tank 5 here used, a fuel supply is conceivable by which the hydrogen is separated from the fuel that is present for the internal combustion engine of the vehicle or is generated by reformation of the fuel, or in which a liquid anode circuit is used (DMFC).

According to the invention, the oxygen necessary for the oxidation is taken from the compressed air from the schematically represented compressed air system 6. The oxygen contained in the air oxidizes the hydrogen or other energy source in the electrolyte solution of the fuel cell arrangement. The chemical energy released is converted to an electron flow, i.e., into electric energy. The reaction product that is thus formed is only water, which is carried away by a drain. Unconsumed, residual air exists through the exhaust line 12. The electrical energy generated is made available through conductor 10 to the electrical loads in the vehicle.

According to the invention, when the vehicle is running, compressed air produced from the compressed air system present in the vehicle is used, after appropriate pressure reduction, to feed air to the fuel cell system 1. Compressed air systems in utility vehicles usually operate with compressed air of 8 to 12 bar. In the case of internal combustion engine drive, the compressed air brake system is supplied by an air compressor which is driven directly or through a belt system by the internal combustion engine. The air compressor and the compressed air reserve tank connected thereto must be of such a size that, even at low speeds with frequent braking, sufficient air is available for the brake system. As a result, when running at high speeds or, during trips involving few brake application, large amounts of excess compressed air are produced, which exit the vehicle through the exhaust system. According to the invention, a portion of this compressed air can be used in order to supply the fuel cell system 1 with the required atmospheric oxygen to provide the necessary electric power.

When the vehicle is standing or at low engine speeds the necessary compressed air for the fuel cell system 1 can be taken from a reserve compressed air tank whenever the compressed air system 6 no longer delivers enough air. In this case, instead of the compressed air system 6 represented in the figure, a compressed air reserve tank 6' can be involved. The changeover of the air supply from the compressed air system to a reserve tank is performed by an appropriate control system according to the speed and the air pressure from the air compressor.

Lastly, as shown in the figure, another changeover to a compressor 8 can be made, which takes in atmospheric air through a line 7, compresses it, and feeds it into the air supply line for the fuel cell arrangement. The motor 9 of compressor 8 is driven electrically by the fuel cell arrangement. In this case the fuel cell system 1 supplies in whole or in part, the energy needed for the air supply. In this manner the independence of the electric power generation from the vehicle engine is assured. For example, after a long stoppage of the motor, electrical power generation by the fuel cell system 1 could be started by the fuel cell system 1 by feeding hydrogen from the hydrogen tank 5 and compressed air from the compressed air reservoir 6, until sufficient energy is produced for the necessary amount of air to be drawn by the compressor 8 from the surrounding air.

The invention makes effective use of the compressed air of the compressed air system present in a vehicle and thereby increases the efficiency of the generation of electric power by a fuel cell system. The connecting of additional air sources or the changeover to available compressed air tanks is possible according to the state of operation of the vehicle. The invention can be integrated universally into already existing fuel cell systems in motor vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system for supplying electrical energy to element devices in a motor vehicle, having a braking system comprising:
    a fuel cell arrangement;
    a fuel source connected by a supply line to said fuel cell arrangement; and
    a vehicle compressed air system for providing air to said braking system of said vehicle wherein said vehicle compressed air system is also connected to a second supply line for providing atmospheric oxygen to said fuel cell system arrangement.

2. The fuel cell system according to claim 1, wherein the compressed air system is an air compressor driven by an internal combustion engine.

3. The fuel cell system according to claim 1 further including a reservoir of compressed air which is switchably connected to said second supply line.

4. The fuel cell system according to claim 1, further comprising a compressor for ambient air wherein said ambient air is switchably connected to said second supply line for supplying atmospheric oxygen to said fuel cell arrangement and wherein said compressor is electrically driven by said fuel cell arrangement.

5. The fuel cell system according to claim 4, wherein the compressor is an air compressor of the compressed air system of the vehicle.

6. A method for supplying electrical energy to a vehicle comprising:
    providing a fuel cell arrangement;
    connecting said fuel cell arrangement to a fuel source; and
    connecting said fuel cell arrangement to a compressed air system of the vehicle wherein said compressed air system supplies compressed air to a braking system of said vehicle and wherein said connection to said fuel cell supplies the fuel cell arrangement with atmospheric oxygen.

7. The method according to claim 6, wherein a pressure of said oxygen air fed to the fuel cell arrangement is reduced before introduction into said fuel cell arrangement.

8. The method according to claim 6, further comprising providing a second source of air from a reservoir.

9. The method according to claim 8, further comprising supplying the fuel cell arrangement with air from said reservoir when said vehicle is operated below a predetermined speed or when there is an air deficiency in the compressed air system.

10. The method according to claim 6, wherein said compressed air system includes a compressor for supplying ambient air which is electrically powered by said fuel cell arrangement and wherein compressed air is used to supply the fuel cell arrangement.

11. The method according to claim 10, wherein said air is fed to the fuel cell arrangement from the compressor for ambient air when the motor is operated below a predetermined speed or in the case of an air deficiency in the compressed air system.

12. A fuel cell system for an automobile having a brake system, comprising:

a source of hydrogen connected to a plurality of fuel cells;

an automobile compressed air source which supplies air to said brake system and is also connected to feed atmospheric oxygen to said plurality of fuel cells.

13. A fuel cell system for supplying electrical devices in a motor vehicle, comprising:

a fuel cell arrangement;

a fuel source connected by a supply line to said fuel cell arrangement; and a vehicle compressed air system connected to said fuel cell arrangement and driven by an internal combustion engine.

14. A method for supplying electrical energy to a vehicle comprising:

providing a fuel cell arrangement;

connecting said fuel cell arrangement to a fuel source; and connecting said fuel cell arrangement to a compressed air system driven by an internal combustion engine.

* * * * *